United States Patent Office 3,801,540
Patented Apr. 2, 1974

3,801,540
DIALKYLHYDROXYPHENYLALKANOIC ACID ESTERS OF DI- AND TRIPENTAERYTHRITOL USEFUL AS POLYMER ANTIOXIDANTS
Martin Dexter, Briarcliff Manor, John D. Spivack, Spring Valley, and David H. Steinberg, Bronx, N.Y., assignors to Ciba-Geigy Corporation, Greenburg, N.Y.
No Drawing. Application June 30, 1969, Ser. No. 837,958, now Patent No. 3,642,868, which is a continuation-in-part of application Ser. No. 502,587, Oct. 22, 1965, which is a continuation-in-part of application Ser. No. 359,460, Apr. 13, 1964, which is a continuation-in-part of application Ser. No. 276,192, Apr. 29, 1963, which is a continuation-in-part of application Ser. No. 164,618, Jan. 5, 1962, which in turn is a continuation-in-part of application Ser. No. 148,738, Oct. 30, 1961, all now abandoned. Divided and this application May 21, 1971, Ser. No. 145,969
Int. Cl. C08f 45/58
U.S. Cl. 260—45.85 B                         10 Claims

ABSTRACT OF THE DISCLOSURE

Esters of dipentaerythritol or tripentaerythritol and 4-hydroxy-5-alkylphenylalkanoic acids having a second alkyl group in the 2 or 3 position of the phenyl ring are stabilizers of organic material. The compounds are obtained through transesterification techniques.

CROSS REFERENCE

This is a division of Ser. No. 837,958, filed June 30, 1969, now U.S. Pat. 3,642,868, which is a continuation-in-part of copending application Ser. No. 502,587 filed Oct. 22, 1965 now abandoned. Ser. No. 502,587 is in turn a continuation-in-part of Ser. No. 359,460, filed Apr. 13, 1964 now abandoned which is a continuation-in-part of Ser. No. 276,192 filed Apr. 29, 1963, now abandoned, which is a continuation-in-part of Ser. No. 164,618 filed Jan. 5, 1962, now abandoned, which is a continuation-in-part of Ser. No. 148,738, filed Oct. 30, 1961, now abandoned.

DETAILED DESCRIPTION

This invention pertains to compounds of the formula:

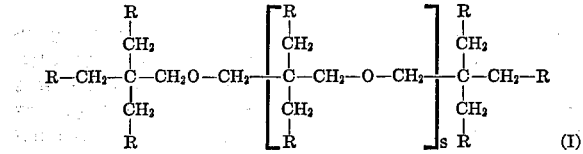

(I)

wherein $s$ has a value of 0 or 1 and each R is a group having the structure:

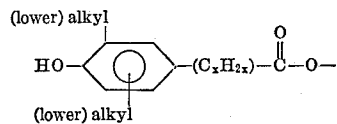

in which $x$ has a value of from 1 to 6.

By the term "(lower)alkyl" in the above formula is intended a group containing a branched or straight chain hydrocarbon chain of from 1 to 6 carbon atoms inclusively. Representative of such (lower)alkyl groups are thus methyl, ethyl, propyl, isopropyl, butyl, t-butyl, pentyl, hexyl and the like.

It will be observed that the di(lower)alkylphenol groups the compounds of the present invention exhibit one (lower)alkyl group in a position ortho to the hydroxy group. A second like or different (lower)alkyl group is either [a] in the other position ortho to the hydroxy group (the 3-position) or [b] meta to the hydroxy group and para to the first (lower)alkyl group (the 2-position).

Thus envisioned are such phenolic groups as 3,5-di-t-butyl-4-hydroxyphenyl, 3,5-dimethyl-4-hydroxyphenyl, 3,5-diisopropyl-4-hydroxyphenyl, 2,5-dimethyl-4-hydroxyphenyl, 2-methyl-4-hydroxy-5-t-butylphenyl, 2-methyl-4-hydroxy-5-isopropylphenyl, 3-methyl-4-hdroxy-5-t-butylphenyl, 3,5-diethyl-4-hydroxyphenyl and the like. Preferred phenolic groups are those having from 1 to 4 carbon atoms in each (lower)alkl group, especially branched groups such as t-butyl in each position ortho to the hydroxy group. This di(lower)alkyl hydroxyphenyl group is bound to an alkanoyloxy unit of from 2 to 7 carbon atoms. The hydrocarbon portion of this alkanoyloxy unit is represented by —($C_xH_{2x}$)— and may be of a straight or, when $x$ is greater than 1, branched chain.

These dialkylhydroxyphenylalkanoic acid esters of di- and tripentaerythritol are stabilizers of organic material normally subject to oxidative deterioration as by light and/or heat. Materials which are thus stabilized according to the present invention include synthetic organic polymeric substances such as vinyl resins formed from the polymerization of vinyl halides or from the copolymerization of vinyl halides with unsaturated polymerizable compounds, e.g., vinyl esters, $\alpha,\beta$-unsaturated ketones, $\alpha,\beta$-unsaturated aldehydes and unsaturated hydrocarbons such as butadienes and styrene; poly-$\alpha$-olefins such as polyethylene, polypropylene, polybutylene, and the like, including copolymers of poly-$\alpha$-olefins; polyisoprene; polychloroprene; polychlorhydrin; terpolymers of ethylene, propylene and a non conjugated diene such as 1,4-hexadiene, ethylidenenorbornene, dicyclopentadiene or the like; polybutadiene, polyurethanes such as are prepared from polyols and organic polyisocyanates; polyamides such as polyhexamethylene adipamide; polyesters such as polymethylene terephthalates; polycarbonates; polyacetals; polystyrene; polyethyleneoxide; and copolymers such as those of high impact polystyrene containing copolymers of butadiene and styrene and those formed by the copolymerization of acrylonitrile, butadiene and/or styrene. Other materials stabilized according to the present invention include lubricating oil of the aliphatic ester type, e.g., di-(2-ethylhexyl)-azelate, pentaerythritol tetracaproate and the like; animal and vegetable derived oils, e.g., linseed oil, fat, tallow, lard, peanut oil, cod liver oil, castor oil, palm oil, corn oil, cotton seed oil and the like, hydrocarbon material such as gasoline, both natural and synthetic diesel oil, mineral oil, fuel oil, drying oil, cutting fluids, waxes, resins and the like, fatty acids such as soaps and the like.

In general the stabilizers of this invention are employed from about 0.005% to about 10% by weight of the stabilized composition, although this will vary with the particular substrate. An advantageous range is from about 0.05 to about 5%, especially 0.1% to about 1%. These compounds are particularly useful for the stabilization of polyolefins such as polypropylene and polyethylene. They may also be blended after polymerization or sprayed on the surface of films, fabrics, filaments or the like to provide effective stabilization.

These compounds can also be used in combination with other additives such as antioxidants, particularly sulfur-containing esters such as DSTDP, DLTDP and the like, pourpoint depressants, corrosion and rust inhibitors, dispersing agents, demulsifiers, antifoaming agents, carbon black, accelerators and other chemicals used in rubber compounding, plasticizers, color stabilizers, di- and trialkyl- and -alkylphenylphosphites, heat stabilizers, ultraviolet stabilizers, dyes, pigments, metal chelating agents, dyesites and the like.

The compounds of the present invention can be prepared via conventional esterification procedures. One particularly advantageous method is transesterification which involves treatment of dipentaerythritol or tripentaerythritol with up to a 15% excess, preferably from 5 to 10% excess, over the stoichiometric amount of an ester of the formula:

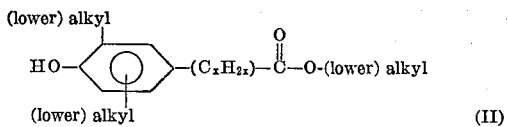

catalyzing the reaciton with a hydride or (lower)alkoxide of an alkaline metal. In general, lithium hydride, lithium methoxides and sodium methoxide are the preferred catalysts. These catalysts are employed in an amount from about 0.01 to about 0.30 molar equivalents per mole of the dipentaerythritol or tripentaerythritol. The reaction is conducted at elevated temperatures and under reduced pressure, the (lower)alkanol which is formed being removed by distillation.

Many of the starting materials of Formula II are known or can be prepared by known procedures. These include the Michael's addition of the phenol and an acrylate, Friedel-Crafts condensations and simple esterification. Typical procedures are described below.

The following examples, presented for illustration and not limitation, will serve to further typify the nature of the present invention. In these examples, parts are by weight unless otherwise specified and temperature is expressed in degrees centigrade. The relationship between parts by weight and parts by volume is as that of grams to cubic centimeters.

EXAMPLE 1

Dipentaerythritol hexakis [3-(3,5-di-t-butyl-4-hydroxyphenyl)propionate]

A reaction vessel is flushed with nitrogen and charged with 7.63 parts of dipentaerythritol and 50 parts by volume of dimethyl sulfoxide. This mixture is warmed to about 80° C. and stirred until a complete solution is obtained. After cooling to 50° C., 0.177 part of lithium hydride is added and a nitrogen purge applied while stirring continuously. When the frothing has subsided, 58.5 parts of methyl 3-(3,5-di-t-butyl-4-hydroxyphenyl) propionate are added and the system evacuated to 20 mm. The mixture is heated at 85–90° C. with stirring for 1¾ hours under the applied vacuum.

The main portion of the solvent is then removed over a two hour period of 90–100° C./12 mm. Upon raising the temperature to 120–130° C. and gradually reducing the vacuum to 0.3–0.5 mm. over a three hour period, the remainder of the solvent is removed. After partially cooling to room temperature, but while still mobile, the reaction mixture is neutralized with 1.2 parts by column of glacial acetic acid. Excess starting ester is removed by vacuum distillation at 120–140° C./0.05 mm. Further purification of the reaction product is accomplished by passing a benzene solution of the residue through a column of adsorbent (silica gel), washing with an additional quantity of the same solvent to remove colored impurities and finally eluting the product with a mixture of benzene and chloroform in the proportion of 1:1. After removal of the solvent, a substantially pure product which is a glass is obtained having a melting point of 70–80° C.

*Analysis.*—Calcd. for $C_{112}H_{166}O_{19}$ (percent): C, 74.05; H, 9.21. Found (percent): C, 73.82; H, 8.82.

Equivalent amounts (5 to 10% excess over the stoichiometric amount) of the following esters are employed in place of methyl 3-(3,5-di-t-butyl-4-hydroxyphenyl) propionate in the foregoing procedure:

(a) methyl 3-(3,5-dimethyl-4-hydroxyphenyl)propionate
(b) ethyl α-(3,5-di-t-butyl-4-hydroxyphenyl)isobutyrate
(c) methyl 2-methyl-4-hydroxy-5-t-butylphenylacetate
(d) 7-(3-methyl-4-hydroxy-5-t-butylphenyl)heptanoate
(e) methyl 3-(3,5-di-isopropyl-4-hydroxyphenyl)propionate
(f) ethyl 2-(3,5-di-t-butyl-4-hydroxyphenyl)propionate
(g) methyl 3,5-dimethyl-4-hydroxyphenylacetate
(h) methyl 3-(3-methyl-4-hydroxy-5-t-butylphenyl) propionate There are thus respectively obtained upon completion of the steps therein described, the following compounds:

(a) dipentaerythritol hexakis [3-(3,5-dimethyl-4-hydroxyphenyl)propionate]
(b) dipentaerythritol hexakis [α-(3,5-di-t-butyl-4-hydroxyphenyl)isobutyrate]
(c) dipentaerythritol hexakis (2-methyl-4-hydroxy-5-t-butylphenylacetate)
(d) dipentaerythritol hexakis [7-(3-methyl-4-hydroxy-5-t-butylphenyl)heptanoate]
(e) dipentaerythritol hexakis [3-(3,5-di-isopropyl-4-hydroxyphenyl)propionate]
(f) dipentaerythritol hexakis [2-(3,5-di-t-butyl-4-hydroxyphenyl)propionate]
(g) dipentaerythritol hexakis (3,5-dimethyl-4-hydroxyphenylacetate)
(h) dipentaerythritol hexakis [3-(3-methyl-4-hydroxy-5-t-butylphenyl)propionate]

EXAMPLE 2

Tripentaerythritol octakis [3-(3,5-di-t-butyl-4-hydroxyphenyl)propionate]

A reaction vessel is flushed with nitrogen and charged with 22.34 parts of tripentaerythritol and 150 parts by volume of dimethyl sulfoxide. This mixture is heated to about 90° C. with stirring and then allowed to cool to room temperature (about 25° C.) and 0.212 part of lithium hydride is then added. After stirring for 30 minutes 154.8 parts of methyl 3-(3,5-di-t-butyl-4-hydroxyphenyl)propionate are added. The system is then evacuated and heated at 80–82° C./15–20 mm. for four hours, at 90° C./20–22 mm. for 1¾ hours, at 73.5–75.5° C./13–23 mm. for two hours and at 120° C./0.35–0.45 mm. for two hours, collecting the solvent distillate. The reaction mixture is then cooled, flushed with nitrogen and rendered neutral with glacial acetic acid. Excess starting ester is removed by vacuum distillation at 220°/0.2–0.3 mm. and the residue is then dissolved in hot benzene and chromatographed on silica gel to yield the product as a glass, M.P. 65–85° C.

Calcd for $C_{151}H_{224}O_{26}$ (percent): C, 73.86; H, 9.20. Found (percent): C, 73.56; H, 9.08.

Similarly by employing in this procedure the ester starting materials described in Example 1, sections (a) through (h), the following compounds are obtained:

(a) tripentaerythritol octakis [3-(3,5-dimethyl-4-hydroxyphenyl)-propionate]
(b) tripentaerythritol octakis [α-(3,5-di-t-butyl-4-hydroxyphenyl) isobutyrate]
(c) tripentaerythritol octakis (2-methyl-4-hydroxy-5-t-butylphenylacetate)
(d) tripentaerythritol octakis [7-(3-methyl-4-hydroxy-5-t-butylphenyl)heptanoate]
(e) tripentaerythritol octakis [3-(3,5-di-isopropyl-4-hydroxyphenyl)propionate]
(f) tripentaerythritol octakis [2-(3,5-di-t-butyl-4-hydroxyphenyl)propionate]
(g) tripentaerythritol octakis (3,5-dimethyl-4-hydroxyphenylacetate)
(h) tripentaerythritol octakis [3-(3-methyl-4-hydroxy-5-t-butylphenyl)propionate]

EXAMPLE 3

The requisite starting materials can be prepared by a variety of known synthetic pathways of which the following three procedures are typical.

(A) Methyl β-(3,5-di-t-butyl-4-hydroxyphenyl)propionate

To 500 parts by volume of dry t-butyl alcohol in a flask fitted with mechanical stirrer, inert gas inlet, thermometer, condenser and dropping funnel are added 2.1 parts of potassium metal. After the ensuing reaction is complete, there are added 37.3 parts of 2,6-di-t-butyl phenol, followed rapidly by 17.7 parts of methylmethacrylate. The stirred reaction mixture is heated to 50° C. for 18 hours and allowed to cool. The solvent is removed under reduced pressure and the residual mass neutralized by addition of dilute hydrochloric acid. This mixture is then extracted with two portions of 200 parts by volume each of ethyl ether. The combined ethereal extracts are washed with two portions of 100 parts by volume each of water and then dried over anhydrous sodium sulfate. The ether layer is removed by filtration and concentrated on a steam bath. The residual oily mass is then vacuum distilled. The fraction collected at 125–130° C./0.1 mm. crystallizes upon standing to yield methyl β-(3,5-di-t-butyl-4-hydroxyphenyl)-propionate, M.P. 63.0–64.5° C. Recrystallization from hexane yields a white solid, M.P. 66–66.5° C.

Utilization of 2-methyl-6-t-butylphenol and 2,6-di-isopropylphenol in the above procedure yields methyl 3-(3-methyl-4-hydroxy-5-t-butylphenyl)propionate, B.P. 136–144° C./0.02 mm. and methyl 3-(3,5-di-isopropyl-4-hydroxyphenyl)propionate, B.P. 130–132° C./0.4 mm.

(B) Ethyl α-(3,5-di-t-butyl-4-hydroxyphenyl) isobutyrate

To 200 parts by volume of dry t-butyl alcohol in a suitable flask fitted with mechanical stirrer, inert gas inlet, thermometer, condenser and dropping funnel is added 22.4 parts of potassium t-butoxide, 41.2 parts of 2,6-di-t-butylphenol and 50 parts by volume of triethylene glycol dimethyl ether. The dark green solution is stirred and a solution of an equimolar portion of ethyl α-bromo-α-methyl-propionate in 50 parts of t-butyl alcohol is added dropwise over 26–60 minutes. After addition is complete, the reaction is refluxed for 1 hour, the solution then being neutral. The reaction mixture is poured into water and extracted with ether. The ethereal solution is washed with water and dried and the ether removed by distillation, the product being isolated by vacuum distillation.

In a similar fashion utilizing ethyl α-bromopropionate, there is obtained ethyl 2-(3,5-di-t-butyl-4-hydroxyphenyl)-propionate, M.P. 54–56° C.

(C) 7-(3-methyl-5-t-butyl-4-hydroxyphenyl)heptanoic acid

To a cooled (−5° C.) solution of 103 parts of ethyl 6-chloroformyl hexanoate in 100 parts by volume of ethylene chloride is rapidly added with stirring 133 parts of granular anhydrous aluminum chloride. To this mixture is next added a solution of 88 parts of 2-methyl-6-t-butylphenol in 500 parts by volume of ethylene chloride. The reaction mixture is stirred at −5° C. for 5 hours and then allowed to slowly attain room temperature overnight. At the end of this time the material is poured over ice, rendered acidic with 6 N hydrochloric acid and extracted with ether. The combined extracts are successively washed with water, dilute aqueous sodium bicarbonate solution and saturated aqueous sodium chloride solution. After drying over sodium sulfate, the solvent is removed under reduced pressure to yield ethyl 6-(3-methyl-5-t-butyl-4-hydroxybenzoyl)-hexanoate, which is saponified with excess potassium hydroxide in methanol. After acidification of the reaction mixture, the solid, comprising 6-(3-methyl-5-t-butyl-4-hydroxybenzoyl)-hexanoic acid, is subjected to a Clemmenson reduction as modified by Martin [J.A.C.S. 58, 1438 (1936)] to yield 7-(3-methyl-5-t-butyl-4-hydroxyphenyl)heptanoic acid which is esterified with ethanol and p-toluenesulfonic acid to yield the corresponding ethyl ester.

In a modification of this Friedel-Crafts reaction, 2,6-dimethylphenol is treated with acrylonitrile in the presence of aluminum chloride to yield 3-(3,5-dimethyl-4-hydroxyphenyl)propionitrile. Upon hydrolysis of this and esterification of the resulting free acid with methanol and p-toluenesulfonic acid, there is obtained methyl 3-(3,5-dimethyl-4-hydroxyphenyl)propionate, M.P. 70–73° C.

What is claimed is:

1. A composition of matter stabilized against oxidative deterioration which comprises an organic material normally subject to deterioration and from about 0.005 to 10% by weight of a compound having the formula

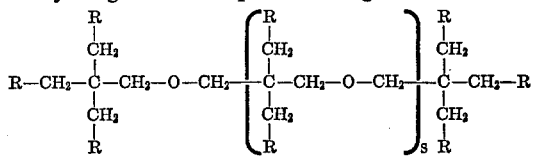

wherein s has a value of 0 or 1 and each R is a group having the structure

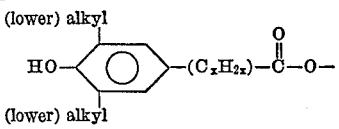

in which x has a value of from 1 to 6.

2. A composition of claim 1 wherein R is a group having the structure

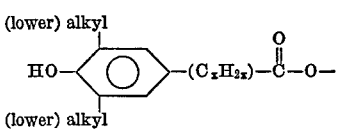

3. A composition of claim 2 wherein x has a value of 2.
4. A composition of claim 3 wherein R is a group having the structure

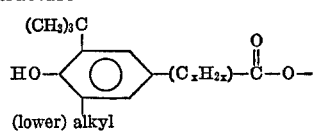

5. A composition of claim 3 wherein R is the group

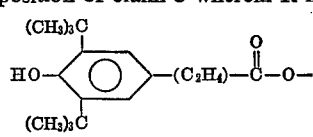

6. A composition of claim 1 wherein the organic material is polyolefin.
7. A composition of claim 1 wherein the organic material is polypropylene.
8. A composition of claim 7 wherein the compound is dipentaerythritol hexakis {3 - (3,5 - di-t-butyl-4-hydroxyphenyl)-propionate}.
9. A composition of claim 7 wherein the compound is dipentaerythritol hexakis {3-(3,5-dimethyl-4-hydroxyphenyl)-propionate}.
10. A composition of claim 7 wherein the compound is tripentaerythritol octakis {3-(3,5-di-t-butyl-4-hydroxyphenyl)propionate}.

References Cited
UNITED STATES PATENTS
3,112,338   11/1963   Smutny et al. _____ 260—45.85

DONALD E. CZAJA, Primary Examiner

V. P. HOKE, Assistant Examiner

U.S. Cl. X.R.

99—163; 252—48.6; 260—2.5 B, 398.5